(12) United States Patent
Tsongas et al.

(10) Patent No.: US 8,542,378 B2
(45) Date of Patent: Sep. 24, 2013

(54) METHOD AND APPARATUS FOR AUTOMATED DETERMINATION OF EXPIRATION OF AN IMAGE PRODUCTION DEVICE THAT IS CURRENTLY IN USE BY A CUSTOMER

(75) Inventors: Jason C. Tsongas, Rochester, NY (US); Matthew O. Scrafford, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 377 days.

(21) Appl. No.: 13/082,773

(22) Filed: Apr. 8, 2011

(65) Prior Publication Data

US 2012/0257239 A1 Oct. 11, 2012

(51) Int. Cl.
*G06K 15/00* (2006.01)
*G06F 15/00* (2006.01)
*G03G 15/00* (2006.01)

(52) U.S. Cl.
USPC .............. 358/1.14; 358/1.9; 358/1.16; 399/9; 399/10; 399/24

(58) Field of Classification Search
None
See application file for complete search history.

(56) References Cited

U.S. PATENT DOCUMENTS

| | | | |
|---|---|---|---|
| 2005/0137945 A1* | 6/2005 | Sato | 705/28 |
| 2007/0019237 A1* | 1/2007 | Nobutani | 358/1.15 |
| 2007/0292145 A1* | 12/2007 | Drose et al. | 399/8 |

* cited by examiner

*Primary Examiner* — Thomas Lett
(74) *Attorney, Agent, or Firm* — Ronald E. Prass, Jr.; Prass LLP

(57) ABSTRACT

A method and apparatus for automated determination of expiration of an image production device that is currently in use by a customer is disclosed. The method may include retrieving values related to a currently used image production device, determining an existing life value based on the retrieved values, retrieving values related to a replacement image production device, determining a replacement value based on the retrieved values comparing the determined existing life value to the determined replacement value, determining whether the currently used image production device should be replaced based on the comparison, and sending a notification that the currently used image production device should be replaced if it is determined that the currently used image production device should be replaced.

21 Claims, 3 Drawing Sheets

METHOD AND APPARATUS FOR AUTOMATED DETERMINATION OF EXPIRATION OF AN IMAGE PRODUCTION DEVICE THAT IS CURRENTLY IN USE BY A CUSTOMER

BACKGROUND

Disclosed herein is a method for automated determination of expiration of an image production device that is currently in use by a customer, as well as corresponding apparatus and computer-readable medium.

Devices, such as image production devices, which have outlived their useful life, are often overlooked due to the manual nature of identifying such devices. For managed services, these devices result in increased maintenance costs, increased service level agreement (SLA) costs, reduced supplies income and overall customer dissatisfaction.

SUMMARY

A method and apparatus for automated determination of expiration of an image production device that is currently in use by a customer is disclosed. The method may include retrieving values related to a currently used image production device, determining an existing life value based on the retrieved values, retrieving values related to a replacement image production device, determining a replacement value based on the retrieved values comparing the determined existing life value to the determined replacement value, determining whether the currently used image production device should be replaced based on the comparison, and sending a notification that the currently used image production device should be replaced if it is determined that the currently used image production device should be replaced.

DETAILED DESCRIPTION

Figure 1:
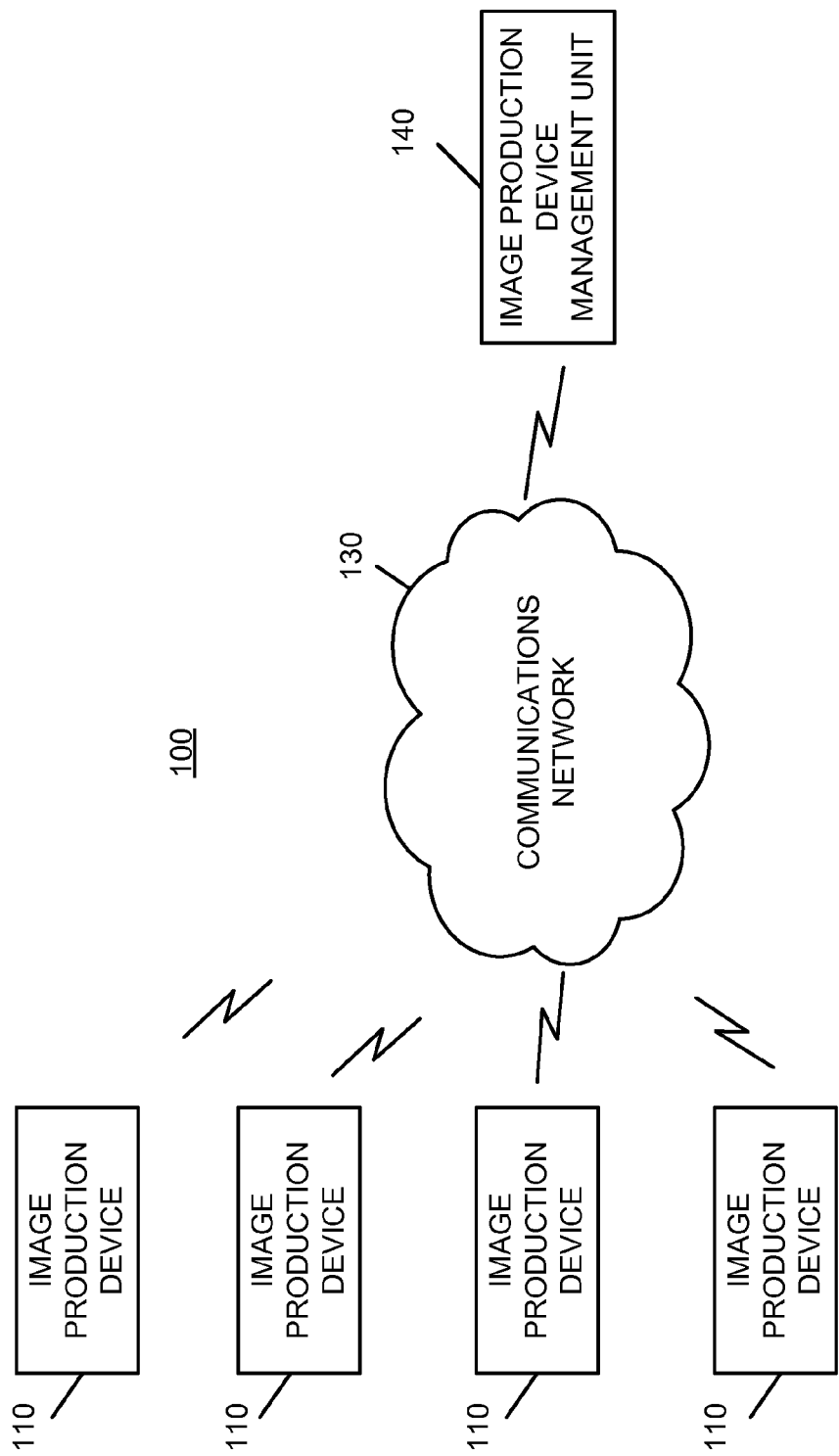
FIG. 1 is an exemplary diagram of an image production device expiration determination environment in accordance with one possible embodiment of the disclosure.

Aspects of the embodiments disclosed herein relate to a method for automated determination of expiration of an image production device that is currently in use by a customer, as well as corresponding apparatus and computer-readable medium.

The disclosed embodiments may include a method for automated determination of expiration of an image production device that is currently in use by a customer. The method may include retrieving values related to at least two of: 1) a frequency of maintenance incidents requiring a use of image production device service personnel, 2) an historical usage volume and costs associated with the historical usage volume, 3) a frequency of negative service level agreement (SLA) impacts and costs, and 4) projected future maintenance item costs, for the currently used image production device, determining an existing life value based on the retrieved values related to at least two of: 1) a frequency of maintenance incidents requiring a use of image production device service personnel, 2) an historical usage volume and costs associated with the historical usage volume, 3) a frequency of negative service level agreement (SLA) impacts and costs, and 4) projected future maintenance item costs, for the currently used image production device, retrieving values related to at least two of: 1) projected future maintenance item costs, 2) replacement image production device cost, 3) value of removed hardware from currently used image production device, and 4) projected frequency of maintenance incidents requiring a use of image production device service personnel, of a replacement image production device that can satisfy the historical usage volume of the currently used image production device, determining a replacement value based on the retrieved values related to at least two of: 1) projected future maintenance item costs, 2) replacement image production device cost, 3) value of removed hardware from currently used image production device, and 4) projected frequency of maintenance incidents requiring a use of image production device service personnel, of a replacement image production device that can satisfy the historical usage volume of the currently used image production device, comparing the determined existing life value to the determined replacement value, determining whether the currently used image production device should be replaced based on the comparison, and sending a notification that the currently used image production device should be replaced if it is determined that the currently used image production device should be replaced.

The disclosed embodiments may further include an apparatus that automatically determines the expiration of an image production device that is currently in use by a customer. That apparatus may include a memory, a communication interface, and an image production device expiration determination unit. The image production device expiration determination unit may retrieve via the communication interface and store in the memory values related to at least two of: 1) a frequency of maintenance incidents requiring a use of image production device service personnel, 2) an historical usage volume and costs associated with the historical usage volume, 3) a frequency of negative service level agreement (SLA) impacts and costs, and 4) projected future maintenance item costs, for the currently used image production device and determine an existing life value based on the retrieved values related to at least two of: 1) a frequency of maintenance incidents requiring a use of image production device service personnel, 2) an historical usage volume and costs associated with the historical usage volume, 3) a frequency of negative service level agreement (SLA) impacts and costs, and 4) projected future maintenance item costs, for the currently used image production device.

The image production device expiration determination unit may further retrieve via the communication interface and store in the memory values related to at least two of: 1) projected future maintenance item costs, 2) replacement image production device cost, 3) value of removed hardware from currently used image production device, and 4) projected frequency of maintenance incidents requiring a use of image production device service personnel, of a replacement image production device that can satisfy the historical usage volume of the currently used image production device and determine a replacement value based on the retrieved values related to at least two of: 1) projected future maintenance item costs, 2) replacement image production device cost, 3) value of removed hardware from currently used image production device, and 4) projected frequency of maintenance incidents requiring a use of image production device service personnel, of a replacement image production device that can satisfy the historical usage volume of the currently used image production device. The image production device expiration determination unit may then compare the determined existing life value to the determined replacement value, determine whether the currently used image production device should be replaced based on the comparison, and send a notification that the currently used image production device should be replaced if it is determined that the currently used image production device should be replaced.

The disclosed embodiments may include a non-transient computer-readable medium storing instructions for automated determination of expiration of an image production device that is currently in use by a customer. The instructions may include retrieving values related to at least two of: 1) a frequency of maintenance incidents requiring a use of image production device service personnel, 2) an historical usage volume and costs associated with the historical usage volume, 3) a frequency of negative service level agreement (SLA) impacts and costs, and 4) projected future maintenance item costs, for the currently used image production device; determining an existing life value based on the retrieved values related to at least two of: 1) a frequency of maintenance incidents requiring a use of image production device service personnel, 2) an historical usage volume and costs associated with the historical usage volume, 3) a frequency of negative service level agreement (SLA) impacts and costs, and 4) projected future maintenance item costs, for the currently used image production device; retrieving values related to at least two of: 1) projected future maintenance item costs, 2) replacement image production device cost, 3) value of removed hardware from currently used image production device, and 4) projected frequency of maintenance incidents requiring a use of image production device service personnel, of a replacement image production device that can satisfy the historical usage volume of the currently used image production device; determining a replacement value based on the retrieved values related to at least two of: 1) projected future maintenance item costs, 2) replacement image production device cost, 3) value of removed hardware from currently used image production device, and 4) projected frequency of maintenance incidents requiring a use of image production device service personnel, of a replacement image production device that can satisfy the historical usage volume of the currently used image production device, comparing the determined existing life value to the determined replacement value, determining whether the currently used image production device should be replaced based on the comparison, and sending a notification that the currently used image production device should be replaced if it is determined that the currently used image production device should be replaced.

One possible embodiment of the present disclosure may extend existing managed service applications to establish a device "expiration date" for devices based on variables such as incident frequency, device usage, replacement cost and SLA costs using existing device management and helpdesk system data. Embodiments herein may expose this information in managed service reporting applications to allow for more immediate removal of these devices and replacement with either a newer model of the device or a replacement device which is less costly to manage.

The data may be derived from either existing or enhanced managed service applications and may include, but are not limited to, one or more of the following:

1. Frequency of image production device incidents requiring service dispatch.

2. Usage volume for the image production device and costs associated.

3. Frequency of negative Service Level Agreement (SLA) impacts and their costs.

4. Total cost of standard maintenance items for the existing device along with actual device cost.

5. Total cost of standard maintenance items for the replacement device along with actual device cost.

6. Cost of replacement hardware which most closely matches the usage volume (#2) and requires less frequent service dispatches.

7. Value of the hardware to be removed (refit/repurposing/removal from books).

8. Planned frequency of device incidents requiring service dispatch for proposed replacement device (using historical data).

Using these variables, the management application on an ongoing basis would be able to determine both the cost of the existing device as well as the cost of a replacement device (either the same and newer or a different device). Once the cost of maintaining the existing device exceeds that of the replacement device, the device would be added to a "recommended for replacement" report. In an embodiment of the disclosure, this report may require human intervention to ultimately weigh the cost benefits of device replacement using the automatically supplied information. Most of the data elements may exist presently across managed service applications associated with the devices.

Embodiments of the present disclosure may extend existing managed service applications to determine whether to repair or replace a device based on one or more of the cost variables including: incident frequency (a), device usage (b), and SLA costs (c), projected maintenance cost (d) and on replacement cost variables: maintenance costs (e), cost of replacement (f), value of removed hardware (g), and projected service requirements (h). The cost of continuing to maintain the device may be calculated by existing device cost, $edc=a+b+c+d$; replacement device cost, $rdc=e+f-g+h$. The device is replaced if using $edc>rdc$. In an embodiment of the present disclosure, these costs may be displayed using existing device management and helpdesk system data. It exposes this information in managed service reporting applications to allow for more immediate removal of these devices and replacement with either a newer model of the device or a replacement device which is less costly to manage.

Note that for the disclosed embodiments below, the following definitions may apply with respect to the retrieved values related to the currently used image production device:

1) a frequency of maintenance incidents requiring a use of image production device service personnel: The historical frequency of maintenance incidents that required a physical visit or telephone advice from service personnel.

2) an historical usage volume and costs associated with the historical usage volume: The usage may be in number of copies produced, age of the device, or a combination thereof.

3) a frequency of negative service level agreement (SLA) impacts and costs: The histroical frequency of SLA incidents from a device and the costs incurred by exceeding contractual service level agreement time frames/frequency for device maintenance.

4) projected future maintenance item costs: The historical cost of maintenance items that will be expected to be replaced give the age and historical and projected future usage of the image production device.

The following definitions may apply with respect to the retrieved values related to the replacement image production device:

1) projected future maintenance item costs: The historical cost of maintenance items that will be expected to be replaced give the age and historical and projected future usage of the image production device.

2) replacement image production device cost: The cost of a replacement image production device that can handle the usage of the currently used device.

3) value of removed hardware from currently used image production device: The value of used parts from the currently used image production device.

4) projected frequency of maintenance incidents requiring a use of image production device service personnel: The historical frequency of maintenance incidents that required a physical visit or telephone advice from service personnel for a device the age, type, and projected usage of the replacement image production device.

FIG. 1 is an exemplary diagram of an image production device expiration determination environment 100 in accordance with one possible embodiment of the disclosure. The image production device expiration determination environment 100 may include one or more image production devices 110, and an image production device management unit 140 connected through the communications network 130. The image production device management unit 140 may be a server, computer, handheld computer or processing device, for example. The image production device 100 may be a copier, a printer, a facsimile device, or a multi-function device, for example.

The image production device management unit 140 may communicate with image production device 110 via a communication interface 120 over communications network 130. In an embodiment of the present disclosure, the image production devices 110 may manufacturer owned, distributor owned, third party owned, and customer owned, for example.

Figure 2:
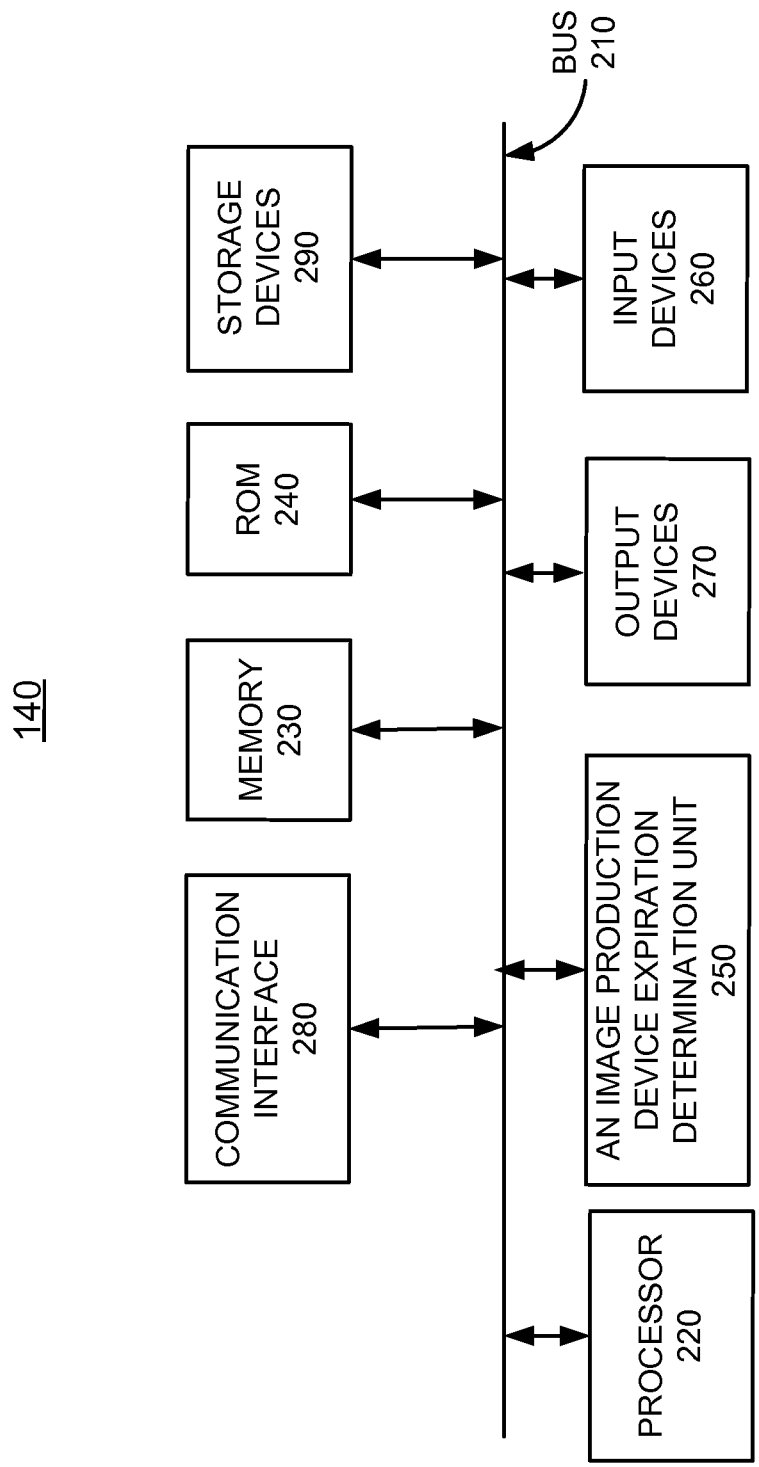
FIG. 2 is an exemplary block diagram of an image production device expiration determination unit in accordance with one possible embodiment of the disclosure.

FIG. 2 is an exemplary block diagram of the image production device management unit 140 in accordance with one possible embodiment of the disclosure. The image production device management unit 140 may include a bus 210, a processor 220, a memory 230, a read only memory (ROM) 240, an image production device expiration determination unit 250, input devices 260, output devices 270, a communication interface 280, and storage device 290. Bus 210 may permit communication among the components of the image production device management unit 140.

Processor 220 may include at least one conventional processor or microprocessor that interprets and executes instructions. The memory 230 may be a random access memory (RAM) or another type of dynamic storage device that stores information and instructions for execution by processor 220. The memory 230 may also include a read-only memory (ROM) 240 which may include a conventional ROM device or another type of static storage device that stores static information and instructions for processor 220.

Input devices 260 may include one or more conventional mechanisms that permit a user to input information to the image production device management unit 140, such as a keyboard, a mouse, a pen, a voice recognition device, etc. Output devices 270 may include one or more conventional mechanisms that output information to the user, including a display, a printer, one or more speakers, or a medium, such as a memory, or a magnetic or optical disk and a corresponding disk drive.

Communication interface 280 may include any mechanism that facilitates communication via a network. For example, the communication interface 280 may include a modem. Alternatively, communication interface 280 may include other mechanisms for assisting in communications with other devices and/or systems.

ROM 240 may include a conventional ROM device or another type of static storage device that stores static information and instructions for processor 220. The storage devices 250 may augment the ROM 240 and may include any type of storage media, such as, for example, magnetic or optical recording media and its corresponding drive.

The image production device management unit 140 may perform such functions in response to processor 220 by executing sequences of instructions contained in a computer-readable medium, such as, for example, the memory 230. Such instructions may be read into the memory 230 from another computer-readable medium, such as a storage device or from a separate device via communication interface 280.

The image production device management unit 140 illustrated in FIGS. 1-2 and the related discussion were intended to provide a brief, general description of a suitable communication and processing environment in which the disclosure may be implemented. Although not required, the disclosure will be described, at least in part, in the general context of computer-executable instructions, such as program modules, being executed by the image production device management unit 140, which may be a server, a computer, a handheld computer, and a processing device, for example.

Generally, program modules include routine programs, objects, components, data structures, etc. that perform particular tasks or implement particular abstract data types. Moreover, those skilled in the art will appreciate that other embodiments of the disclosure may be practiced in communication network environments with many types of communication equipment and computer system configurations, including personal computers, hand-held devices, multi-processor systems, microprocessor-based or programmable consumer electronics, and the like.

The operation of the image production device expiration determination unit 250 process will be discussed below in relation to the flowchart in FIG. 3.

Figure 3:
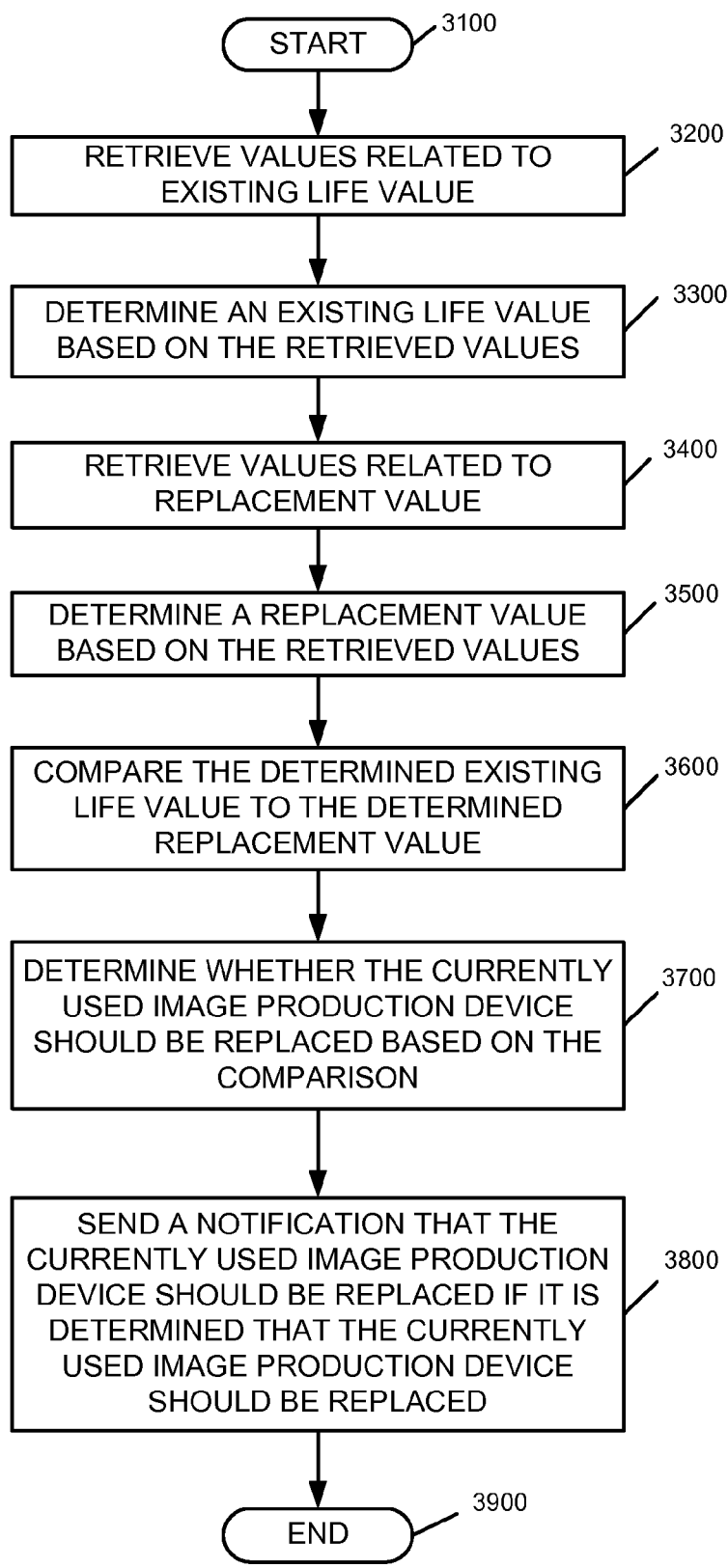
FIG. 3 is flowchart of an automated determination of expiration of an image production device that is currently in use by a customer process in accordance with one possible embodiment of the disclosure.

FIG. 3 is flowchart of an automated determination of expiration of an image production device 100 process in accordance with one possible embodiment of the disclosure.

The process may begin at step 3100 and may continue to step 3200 where the image production device expiration determination unit 250 may retrieve values related to at least two of: 1) a frequency of maintenance incidents requiring a use of image production device service personnel, 2) an historical usage volume and costs associated with the historical usage volume, 3) a frequency of negative service level agreement (SLA) impacts and costs, and 4) projected future maintenance item costs, for the currently used image production device 100.

At step 3300, the image production device expiration determination unit 250 may determine an existing life value based on the retrieved values related to at least two of: 1) a frequency of maintenance incidents requiring a use of image production device service personnel, 2) an historical usage volume and costs associated with the historical usage volume, 3) a frequency of negative service level agreement (SLA) impacts and costs, and 4) projected future maintenance item costs, for the currently used image production device 100.

At step 3400, the image production device expiration determination unit 250 may retrieve values related to at least two of: 1) projected future maintenance item costs, 2) replacement image production device cost, 3) value of removed hardware from currently used image production device, and 4) projected frequency of maintenance incidents requiring a use of image production device service personnel, of a replacement image production device 100 that can satisfy the historical usage volume of the currently used image production device 100. Note that one or more of the retrieved values may be retrieved from the memory 230, the storage device 290, or a remote storage device through the communication interface 280, for example.

At step 3500, the image production device expiration determination unit 250 may determine a replacement value based on the retrieved values related to at least two of: 1) projected future maintenance item costs, 2) replacement image production device cost, 3) value of removed hardware from currently used image production device 100, and 4) projected frequency of maintenance incidents requiring a use of image production device service personnel, of a replacement image production device 100 that can satisfy the historical usage volume of the currently used image production device 100.

In step 3600, the image production device expiration determination unit 250 may compare the determined existing life value to the determined replacement value. At step 3700, the image production device expiration determination unit 250 may determine whether the currently used image production device 100 should be replaced based on the comparison. At step 3800, the image production device expiration determination unit 250 may send a notification that the currently used image production device 100 should be replaced if it is determined that the currently used image production device 100 should be replaced.

In one possible embodiment of the present disclosure, the notification may include the determined existing life value, the determined replacement value, the comparison information, or one or more of the retrieved values, along with the notification.

Some embodiments of the present disclosure may provide that if it is determined that the currently used image production device should not be replaced based on the comparison, the image production device expiration determination unit 250 may project when the currently used image production device is likely to need replacement and sends a notification with the projection. The projection notification may include the determined existing life value, the determined replacement value, the comparison information, or one or more of the retrieved values along with the projection notification.

Embodiments as disclosed herein may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, and the like that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described therein.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method for automated determination of expiration of an image production device that is currently in use by a customer, comprising:

retrieving values related to at least two of: 1) a frequency of maintenance incidents requiring a use of image production device service personnel, 2) an historical usage volume and costs associated with the historical usage volume, 3) a frequency of negative service level agreement (SLA) impacts and costs, and 4) projected future maintenance item costs, for the currently used image production device;

determining an existing life value based on the retrieved values related to at least two of: 1) a frequency of maintenance incidents requiring a use of image production device service personnel, 2) an historical usage volume and costs associated with the historical usage volume, 3) a frequency of negative service level agreement (SLA) impacts and costs, and 4) projected future maintenance item costs, for the currently used image production device;

retrieving values related to at least two of: 1) projected future maintenance item costs, 2) replacement image production device cost, 3) value of removed hardware from currently used image production device, and 4) projected frequency of maintenance incidents requiring a use of image production device service personnel, of a replacement image production device that can satisfy the historical usage volume of the currently used image production device;

determining a replacement value based on the retrieved values related to at least two of: 1) projected future maintenance item costs, 2) replacement image production device cost, 3) value of removed hardware from currently used image production device, and 4) projected frequency of maintenance incidents requiring a use of image production device service personnel, of a replacement image production device that can satisfy the historical usage volume of the currently used image production device;

comparing the determined existing life value to the determined replacement value;

determining whether the currently used image production device should be replaced based on the comparison; and sending a notification that the currently used image production device should be replaced if it is determined that the currently used image production device should be replaced.

2. The method of claim 1, wherein if it is determined that the currently used image production device should not be replaced based on the comparison, projecting when the currently used image production device is likely to need replacement and sending a notification with the projection.

3. The method of claim 2, wherein the projection notification includes at least one of the determined existing life value, the determined replacement value, the comparison information, and one or more of the retrieved values along with the projection notification.

4. The method of claim 1, wherein the currently used image production device is one of manufacturer owned, distributor owned, third party owned, and customer owned.

5. The method of claim 1, wherein the notification includes at least one of the determined existing life value, the determined replacement value, the comparison information, and one or more of the retrieved values along with the notification.

6. The method of claim 1, wherein the method is performed by one of a server, a computer, a handheld computer, and a processing device.

7. The method of claim 1, wherein the image production device is one of a copier, a printer, a facsimile device, and a multi-function device.

8. An apparatus that automatically determines the expiration of an image production device that is currently in use by a customer, comprising:
   a memory;
   a communication interface; and
   an image production device expiration determination unit that:
      retrieves via the communication interface and stores in the memory values related to at least two of: 1) a frequency of maintenance incidents requiring a use of image production device service personnel, 2) an historical usage volume and costs associated with the historical usage volume, 3) a frequency of negative service level agreement (SLA) impacts and costs, and 4) projected future maintenance item costs, for the currently used image production device;
      determines an existing life value based on the retrieved values related to at least two of: 1) a frequency of maintenance incidents requiring a use of image production device service personnel, 2) an historical usage volume and costs associated with the historical usage volume, 3) a frequency of negative service level agreement (SLA) impacts and costs, and 4) projected future maintenance item costs, for the currently used image production device;
      retrieves via the communication interface and stores in the memory values related to at least two of: 1) projected future maintenance item costs, 2) replacement image production device cost, 3) value of removed hardware from currently used image production device, and 4) projected frequency of maintenance incidents requiring a use of image production device service personnel, of a replacement image production device that can satisfy the historical usage volume of the currently used image production device;
      determines a replacement value based on the retrieved values related to at least two of: 1) projected future maintenance item costs, 2) replacement image production device cost, 3) value of removed hardware from currently used image production device, and 4) projected frequency of maintenance incidents requiring a use of image production device service personnel, of a replacement image production device that can satisfy the historical usage volume of the currently used image production device; and
      comparing the determined existing life value to the determined replacement value;
      determining whether the currently used image production device should be replaced based on the comparison; and
      sending a notification that the currently used image production device should be replaced if it is determined that the currently used image production device should be replaced.

9. The apparatus of claim 8, wherein if it is determined that the currently used image production device should not be replaced based on the comparison, the image production device expiration determination unit projects when the currently used image production device is likely to need replacement and sends a notification with the projection.

10. The apparatus of claim 9, wherein the projection notification includes at least one of the determined existing life value, the determined replacement value, the comparison information, and one or more of the retrieved values along with the projection notification.

11. The apparatus of claim 8, wherein the currently used image production device is one of manufacturer owned, distributor owned, third party owned, and customer owned.

12. The apparatus of claim 8, wherein the notification includes at least one of the determined existing life value, the determined replacement value, the comparison information, and one or more of the retrieved values along with the notification.

13. The apparatus of claim 8, wherein the apparatus is one of a server, a computer, a handheld computer, and a processing device.

14. The apparatus of claim 8, wherein the image production device is one of a copier, a printer, a facsimile device, and a multi-function device.

15. A non-transient computer-readable medium storing instructions for automated determination of expiration of an image production device that is currently in use by a customer, the instructions comprising:
   retrieving values related to at least two of: 1) a frequency of maintenance incidents requiring a use of image production device service personnel, 2) an historical usage volume and costs associated with the historical usage volume, 3) a frequency of negative service level agreement (SLA) impacts and costs, and 4) projected future maintenance item costs, for the currently used image production device;
   determining an existing life value based on the retrieved values related to at least two of: 1) a frequency of maintenance incidents requiring a use of image production device service personnel, 2) an historical usage volume and costs associated with the historical usage volume, 3) a frequency of negative service level agreement (SLA) impacts and costs, and 4) projected future maintenance item costs, for the currently used image production device;
   retrieving values related to at least two of: 1) projected future maintenance item costs, 2) replacement image production device cost, 3) value of removed hardware from currently used image production device, and 4) projected frequency of maintenance incidents requiring a use of image production device service personnel, of a replacement image production device that can satisfy the historical usage volume of the currently used image production device;

determining a replacement value based on the retrieved values related to at least two of: 1) projected future maintenance item costs, 2) replacement image production device cost, 3) value of removed hardware from currently used image production device, and 4) projected frequency of maintenance incidents requiring a use of image production device service personnel, of a replacement image production device that can satisfy the historical usage volume of the currently used image production device;

comparing the determined existing life value to the determined replacement value;

determining whether the currently used image production device should be replaced based on the comparison; and sending a notification that the currently used image production device should be replaced if it is determined that the currently used image production device should be replaced.

16. The non-transient computer-readable medium of claim 15, wherein if it is determined that the currently used image production device should not be replaced based on the comparison, projecting when the currently used image production device is likely to need replacement and sending a notification with the projection.

17. The non-transient computer-readable medium of claim 16, wherein the projection notification includes at least one of the determined existing life value, the determined replacement value, the comparison information, and one or more of the retrieved values along with the notification.

18. The non-transient computer-readable medium of claim 15, wherein the currently used image production device is one of manufacturer owned, distributor owned, third party owned, and customer owned.

19. The non-transient computer-readable medium of claim 15, wherein the notification includes at least one of the existing life value, the replacement value and one or more of the retrieved values along with the notification.

20. The non-transient computer-readable medium of claim 15, wherein the instructions are performed by one of a server, a computer, a handheld computer, and a processing device.

21. The non-transient computer-readable medium of claim 15, wherein the image production device is one of a copier, a printer, a facsimile device, and a multi-function device.

* * * * *